(No Model.)

C. W. ROBINSON.
ANTIFRICTION BEARING.

No. 570,504.      Patented Nov. 3, 1896.

Witnesses
Peter Hoop
Jimmy McLaurington

Inventor
Charles W. Robinson
by Vernon Dorsey
his Attorney

UNITED STATES PATENT OFFICE.

CHARLES WEBSTER ROBINSON, OF FLORENCE, ALABAMA.

ANTIFRICTION-BEARING.

SPECIFICATION forming part of Letters Patent No. 570,504, dated November 3, 1896.

Application filed December 20, 1895. Serial No. 572,823. (No model.)

*To all whom it may concern:*

Be it known that I, CHARLES WEBSTER ROBINSON, a citizen of the United States, residing at Florence, in the county of Lauderdale and State of Alabama, have invented certain new and useful Improvements in Antifriction-Bearings; and I do hereby declare the following to be a full, clear, and exact description of the invention, such as will enable others skilled in the art to which it appertains to make and use the same.

My invention relates to certain improvements in antifriction-bearings for wheels, such as the wheels of a wagon; and it consists of a series of rollers properly mounted in rings and interposed between the skein and the boxing of the wheel; and for this purpose it consists in the construction, arrangement, and combination of the several parts of which it is composed, as will be hereinafter more fully described and claimed.

Figure 1:
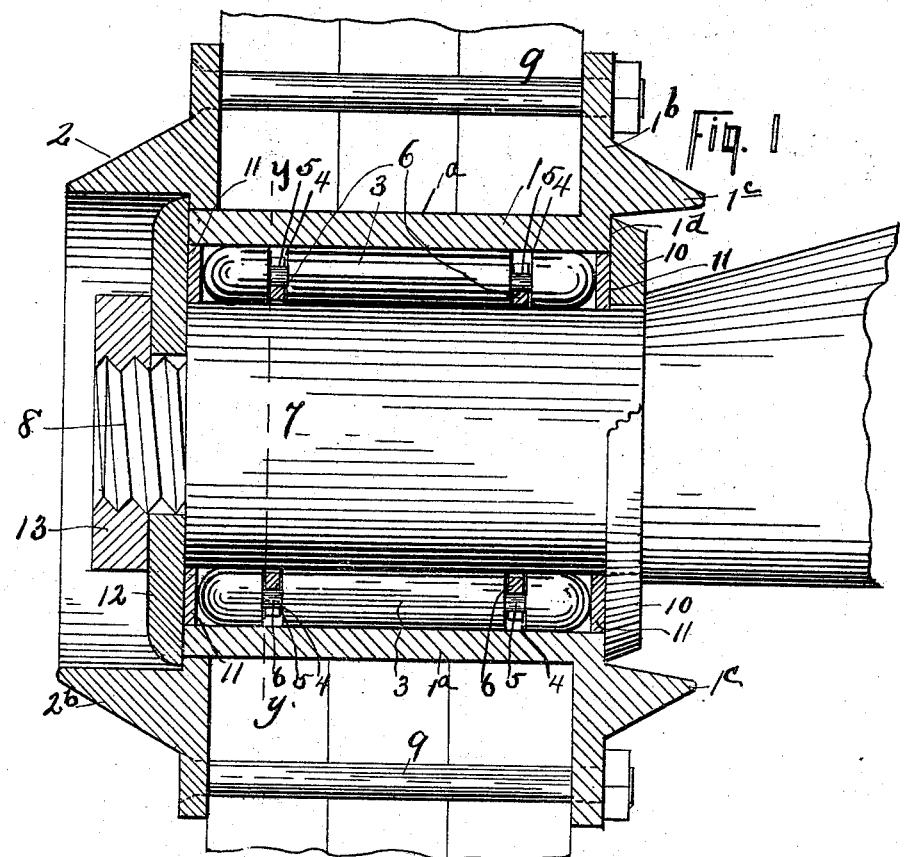
Figure 2:
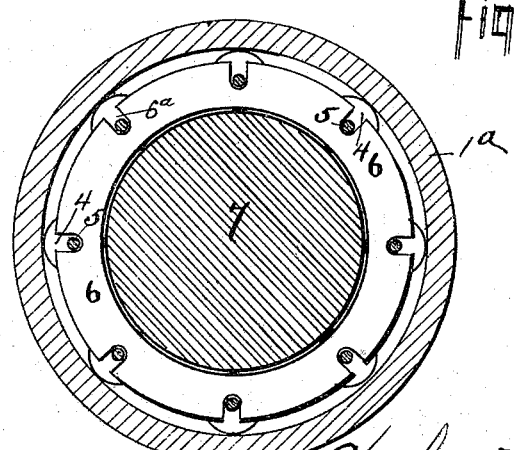

Referring to the accompanying drawings, in which corresponding parts are designated by similar marks of reference, Figure 1 is an elevation, partly in section, of a bearing constructed in accordance with this invention; and Fig. 2 is a vertical section on line $y$ $y$ thereof.

The box 1 is of the general character described, shown, and claimed in Letters Patent No. 494,168, granted to me March 28, 1893, for improvements in wheels, that is to say, it consists of a box $1^a$, having an annular flange $1^b$, formed integral with the inner end thereof, while a sand-band $1^c$ projects from said flange, the diameter of the band being greater than the inner diameter of the box.

A collar 2 is provided with an annular outwardly-projecting flange $2^b$, the interior or central portion of the collar being bored out so as to permit the passage of the collar upon the box 1. The rollers 3 are provided near each of their ends with peripheral grooves 4, the parts of the rollers being connected by necks 5. The two rings 6 are provided with open notches, forming bearings for the necks 5 of the rollers, the diameter of the rings, the depth of the notches, and the diameter of the rollers being so proportioned that the rollers when mounted in the rings have their opposite surfaces bearing upon the tubular skein and the interior of the box. The end of the skein 7 is reduced and threaded at 8.

Upon the box 1 is mounted a suitable wheel, by preference such as is described and claimed in my hereinbefore mentioned Letters Patent, it being clamped between the flange $1^b$ and the collar 2, which are drawn together by bolts 9, extending through the wheel and the said collar and flange.

A collar 10 is mounted upon the skein 7, and is of such a diameter as to rest snugly within the sand-band $1^c$ and against the seat $1^d$, formed within the band and upon the end of the box, thus preventing the entrance of sand and dirt. Suitable washers 11 may be mounted upon the skein on each end of the rollers to provide a good bearing-surface for the ends of the rollers, which are rounded at their ends to reduce the bearing parts and thus the friction of rotation of the rollers to a minimum. The box 1 and wheel carried thereby are held upon the skein by a washer 12, inserted within the flange $2^b$ of the collar 2, and by the nut 13, bearing upon the outer surface of the washer 12 and taking upon the threaded end 8 of the skein.

It will be seen that the rings 6, having the bearing-notches $6^a$ therein, form a cage in which the rollers 3 are mounted, thus permitting the ready insertion of the rollers in place. It will also be seen that as such cage, as well as each of the individual rollers mounted therein, is capable of rotation, the cage around the skein and each of the rollers around the necks 5, that the wear will be uniformly distributed to each of the rollers, and that the rounded form of the ends of the rollers reduced to a minimum the end friction thereon, thus reducing the total friction against the rotation of a wheel provided with my invention.

It is obvious that my invention may be applied not only to vehicle-wheels, which is the purpose to which it is shown as applied in the accompanying drawings, but also to any class of wheels and to any device in which one part revolves upon another.

Having thus described my invention, what I claim is—

In a bearing for wheels, the combination, with a skein and an axle-box, of washers contained within the opposite ends of the said box and mounted upon the skein, rings provided with notches in their peripheries, and mounted on the skein intermediate of the said washers, and cylindrical rollers, having rounded ends of the same size as the bodies of the rollers, the cylindrical portion of such rollers being separated by necks contained within the said notches, and the rounded ends of the rollers bearing on the said washers, substantially as described.

In testimony whereof I affix my signature in presence of two witnesses.

CHARLES WEBSTER ROBINSON.

Witnesses:
 IRVIN GUTHRIE,
 ANNA BRADOW.